US012508919B2

(12) United States Patent
Miller et al.

(10) Patent No.: US 12,508,919 B2
(45) Date of Patent: Dec. 30, 2025

(54) CONSTRUCTION MACHINE

(71) Applicant: BAUER Maschinen GmbH, Schrobenhausen (DE)

(72) Inventors: Florian Miller, Egweil (DE); Gernot Skirlo, Neuburg / Donau (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 364 days.

(21) Appl. No.: 18/253,292

(22) PCT Filed: Nov. 26, 2021

(86) PCT No.: PCT/EP2021/083085
§ 371 (c)(1),
(2) Date: May 17, 2023

(87) PCT Pub. No.: WO2022/122406
PCT Pub. Date: Jun. 16, 2022

(65) Prior Publication Data

US 2024/0010075 A1 Jan. 11, 2024

(30) Foreign Application Priority Data

Dec. 9, 2020 (EP) .................................... 20212704

(51) Int. Cl.
*B60L 9/00* (2019.01)
*E02F 9/24* (2006.01)
*E02F 9/26* (2006.01)

(52) U.S. Cl.
CPC *B60L 9/00* (2013.01); *E02F 9/24* (2013.01); *E02F 9/261* (2013.01)

(58) Field of Classification Search
CPC .......... B60L 9/00; B60L 9/04; B60L 2200/40; E02F 9/24; E02F 9/261; E02F 9/0858;
(Continued)

(56) References Cited

U.S. PATENT DOCUMENTS 4,587,383 A * 5/1986 Stoldt ...................... B60M 7/00
254/277
6,226,389 B1 * 5/2001 Lemelson ............. G01S 13/931
382/104
(Continued)

FOREIGN PATENT DOCUMENTS

CN 110832145 A * 2/2020 .............. E02F 3/961
DE 202011100095 U1 * 8/2012 .............. E02F 3/386
(Continued)

OTHER PUBLICATIONS

KR-20100003973-U (Year: 2010).*
(Continued)

*Primary Examiner* — Michael T. Walsh
(74) *Attorney, Agent, or Firm* — Studebaker Brackett PLLC

(57) ABSTRACT

The invention relates to a construction machine having an upper carriage, an undercarriage which has a running gear and on which the upper carriage is rotatably supported about an upright axis, and a feed arm for at least one energy line, with which energy can be supplied from the outside to the construction machine, wherein the feed arm is adjustably supported on the upper carriage. In accordance with the invention at least one drive means for actively adjusting the feed arm relative to the upper carriage is provided.

15 Claims, 2 Drawing Sheets

Figure 1:
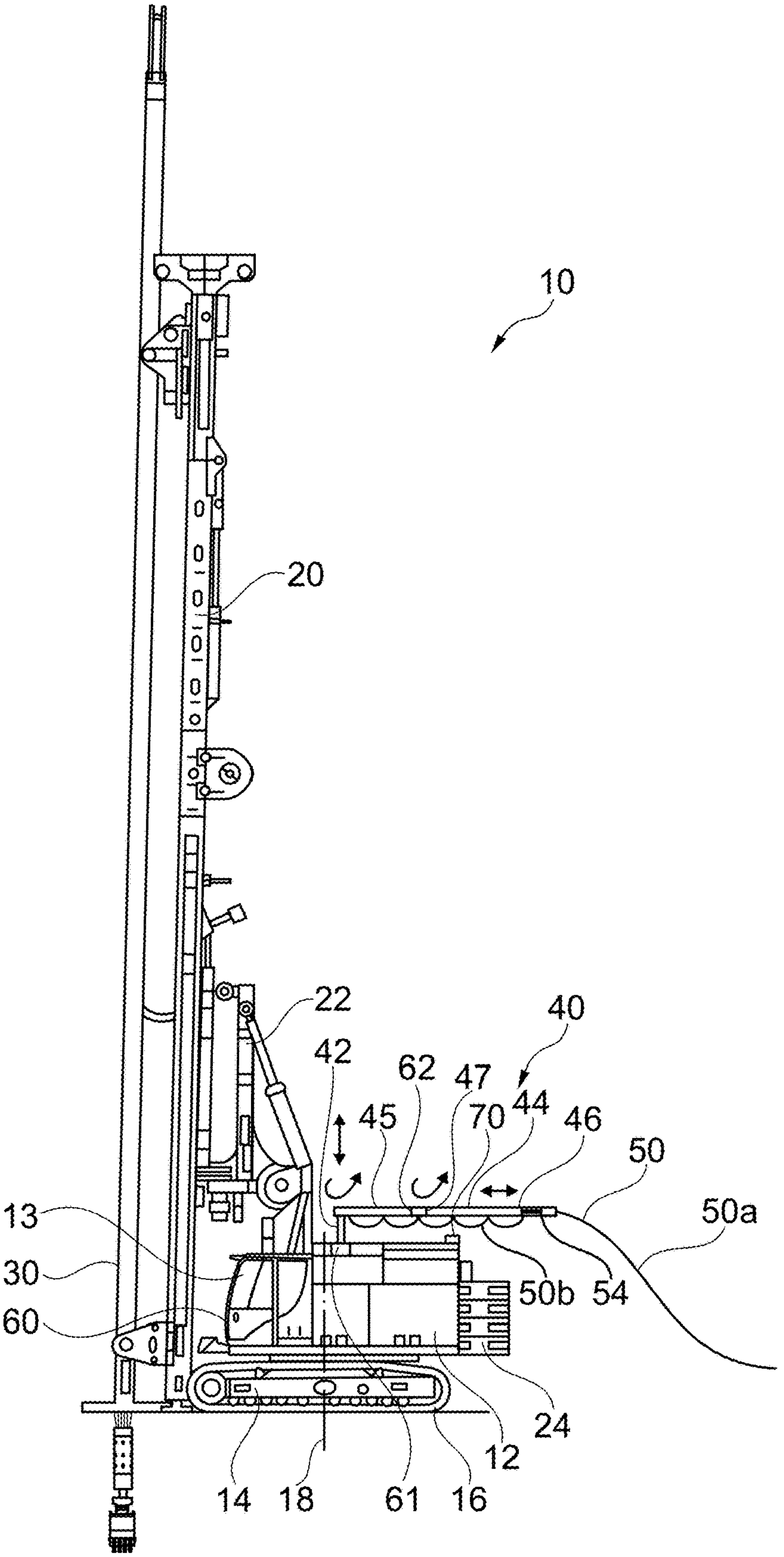

(58) Field of Classification Search
CPC .... E02F 3/30; E02F 9/207; E02D 7/22; E02D 17/13
See application file for complete search history.

(56) References Cited

U.S. PATENT DOCUMENTS

| | | | | |
|---|---|---|---|---|
| 2002/0154984 A1* | 10/2002 | Schaeff | E02F 9/02 414/729 |
| 2006/0182608 A1 | 8/2006 | Kinoshita et al. | |

FOREIGN PATENT DOCUMENTS

| | | | | | |
|---|---|---|---|---|---|
| EP | 1182302 | A1 * | 2/2002 | E02F 9/085 |
| JP | H08158407 | A * | 6/1996 | E02F 9/0858 |
| JP | H11132071 | A * | 5/1999 | E02F 9/2296 |
| JP | 2013234474 | A * | 11/2013 | |
| JP | 2014-084569 | A | 5/2014 | |
| JP | 2017-014687 | A | 1/2017 | |
| JP | 6752125 | B2 | 9/2020 | |
| JP | 6769918 | B2 * | 10/2020 | |
| KR | 20100003973 | U * | 4/2010 | E02F 9/0858 |
| WO | 2013/162448 | A1 | 10/2013 | |

OTHER PUBLICATIONS

JP-H08158407-A (Year: 1996).*
CN-110832145-A (Year: 2020).*
JP-H11132071-A (Year: 1999).*
DE-202011100095-U1 (Year: 2012).*
JP-6769918-B2 (Year: 2020).*
EP-1182302-A1 (Year: 2002).*
JP-2013234474-A (Year: 2013).*
KR-20100003973-U English Translation (Year: 2010).*
JP-H08158407-A English Translation (Year: 1996).*
JP-H11132071-A English Translation (Year: 1999).*
JP-6769918-B2 English Translation (Year: 2020).*
JP-2013234474-A English Translation (Year: 2013).*
International Preliminary Report on Patentability and Written Opinion issued in PCT/EP2021/083085 on Jun. 13, 2023.
International Search Report issued in PCT/EP2021/083085; mailed Feb. 9, 2022.

* cited by examiner

CONSTRUCTION MACHINE

The invention relates to a construction machine having an upper carriage, an undercarriage which has a running gear and on which the upper carriage is rotatably supported about an upright axis, and a feed arm for at least one energy line, with which energy can be supplied from the outside to the construction machine, wherein the feed arm is adjustably supported on the upper carriage, in accordance with the preamble of claim 1.

A generic construction machine can be taken from WO 2013/162448 A1.

Especially for reasons of environmental protection and to reduce noise emission construction machines are driven partially or even fully electrically. Due to the high energy requirement a mobile construction machine therefore has to be supplied via an energy line with energy, in particular electric power. In the case of construction machines having an undercarriage and an upper carriage rotatably supported thereon there is the problem of safe energy supply. When feeding the energy line to the undercarriage there exists an increased danger of damage caused by the running gear since the energy line is guided relatively close to the ground.

When feeding energy to a rotatable upper carriage the risk arises that when the rotational position is changed an undesired over-stretching of the energy line resulting in damage or even tearing-off of the energy line may occur. To counteract this risk it is known from the stated WO 2013/162448 A1, for example, that a pivotably supported feed arm is provided on the upper side of the upper carriage.

The invention is based on the object to provide a construction machine in which a line feed to the construction machine is particularly safe.

The object is achieved by a construction machine having the features of claim 1. Preferred embodiments of the invention are stated in the dependent claims.

The construction machine according to the invention is characterized in that at least one drive means for actively adjusting the feed arm relative to the upper carriage is provided.

A basic idea of the invention is to provide at least one drive means, i.e. a motor or a motorized drive, with or without transmission arrangement, with which the feed arm can be actively adjusted relative to the upper carriage. A transmission arrangement can comprise gear wheels, levers or ropes. Through active adjustment of the feed arm, especially when the upper carriage is rotated, stress on the energy line and in particular tensile stress thereon can be specifically prevented or reduced effectively. The force required to pivot the feed arm therefore does not have to be applied through the movement of the upper carriage and thus through mechanical tension between the feed arm and the energy line. In fact, the feed arm can be specifically and actively adjusted. This can reduce stress of the energy line caused by mechanical forces. This also reduces the risk of tearing-off of the energy line during operation which can lead to work stoppage. Especially when feeding electric power this results in an increase of occupational safety. The energy line does not or not solely have to be provided for electric power. It can also be designed to convey hydraulic fluid, pressurized air etc. as well as data.

A preferred embodiment of the invention resides in the fact that a control means is provided, by which a position of the upper carriage relative to the undercarriage can be detected, and that the control means is designed to control the at least one drive means depending on a detected change of position of the upper carriage. The position of the upper carriage relative to the undercarriage can be determined by way of an appropriate sensor, in particular a rotation angle detector. If, starting from an initial position in which undercarriage and upper carriage are preferably aligned in the same way in a basic arrangement, the upper carriage is pivoted with respect to the undercarriage in construction operation, the pivot angle can be detected and forwarded to the control means. Depending on the detected change in angle the control means can control at least one drive means so that the feed arm with the energy line is adjusted in a desired way relative to the upper carriage.

According to a further development of the invention it is preferred that the control means is designed to control the at least one drive means such that the feed arm is at a standstill or largely at a standstill relative to the energy line fed from the outside. As a result, a transmission of mechanical forces to the energy line due to movement of the upper carriage can be reduced to a large degree or almost completely. Provision can be made for one or several drive means that are designed for rotation, pivoting, height-displacement or longitudinal displacement of components of the feed arm.

According to a further development of the invention it is particularly efficient that the feed arm is pivotably supported about a pivot axis on an upper side of the upper carriage. For this reason, the feed arm can be designed as a cantilever arm that extends radially from the pivot axis beyond the external dimensions of the upper carriage or the construction machine. This arrangement allows particularly good feeding and tracking of an energy line.

According to a further development of the invention it is especially advantageous that the pivot axis of the feed arm is directed parallel to the upright axis of the upper carriage and/or arranged in the region of the upright axis. An upright axis is to be understood as a substantially vertically directed axis that is aligned perpendicularly with respect to a horizontal base plane. The closer the pivot axis of the feed arm is located in the region of the upright axis of the upper carriage, the better a rotational movement of the upper carriage can be compensated with respect to the energy line. The pivot axis can be formed by a vertically directed shank, on which a transversely directed cantilever arm is arranged to form the feed arm. The shank can be a rotatably supported shaft which itself is an integral part of the feed arm. Alternatively, the shank can be firmly mounted on the upper carriage, with the feed arm being rotatably supported on the shank.

A particularly advantageous embodiment of the invention resides in the fact that the pivot axis of the feed arm is arranged coaxially to the upright axis of the upper carriage. Hence, the upright axis and the pivot axis form a joint axis of rotation. This prevents the occurrence of mechanical tension in the energy line to an especially high degree when the upper carriage is pivoted.

Furthermore, according to an embodiment variant of the invention it is preferred that the feed arm is directed radially to the upright axis of the upper carriage and designed with a length, wherein in every pivot position the feed arm projects laterally over the upper carriage. In particular, the feed arm can be designed such that the energy line does not come to rest on the upper carriage by rubbing against it so that frictional wear on the external side of the energy line is prevented.

According to a further development of the invention it is especially advantageous that the length of the feed arm is adjustable, in particular depending on a pivot position of the feed arm relative to the upper carriage. For this reason, the feed arm can in particular have a variable length in the radial direction and be adjusted in the longitudinal direction by a corresponding drive means. More particularly, the feed arm can be telescopic in the radial direction, whereby depending on the pivot angle and the usually approximately rectangular upper carriage a sufficient length of the feed arm is ensured during pivoting. In this way, it can be guaranteed that even when running over the corner regions of the upper carriage the energy line does not rub against the upper carriage and also that in other rotational positions a too far radial projection of the feed arm over the upper carriage does not occur. The length of the feed arm can be set by the control means depending on the pivot angle of the upper carriage and the position of the feed arm.

According to a further embodiment variant of the invention particularly good adjustment can be achieved in that the feed arm comprises at least two arm members which are adjustable with respect to each other. Provision can also be made for three or more arm members. For this reason, the arm members can be linearly displaceable with respect to each other and/or pivotably supported with respect to each other via corresponding pivot joints. By preference, the arm members are specifically adjustable with respect to each other via one or several drive means, in which case the drive means can each be controlled by the control means.

According to a further possible embodiment of the invention it is particularly expedient that the at least two arm members are pivotably connected to each other via at least one joint. The axes of the pivot joints can thereby be parallel to the upright axis or also directed transversely thereto. In this way, a desired two- or three-dimensional adjustment of the feed arm in space can be set in relation to the upper carriage.

According to a further embodiment of the invention it is especially advantageous that the feed arm is height-adjustable in the axial direction of the pivot axis. For example for transport purposes the feed arm can thus be drawn in and moved into a retracted position, preferably in a corresponding recess on the upper carriage. Hereby, a folding or retraction can also take place in a radial direction. In operation the feed arm can then be extended from the retracted position into an operating position, in which at least the radial section of the feed arm is arranged so as to be spaced apart from the upper carriage. For this reason, the shank of the pivot axis can in particular be telescopic and adjustable via a drive means.

By preference, the control means is designed to detect, with or without sensors, a set-up state of the construction machine, in particular if additional components, such as a concrete pump or counterweights, are mounted on the upper carriage. Depending on the detected states the control means can set an appropriate size of the feed arm.

Another preferred embodiment of the invention resides in the fact that a warning means is provided, by which a position of the feed arm relative to the upper carriage and/or to further components of the construction machine and/or to obstacles in the surrounding area can be detected and a possible collision with the feed arm can be established. By way of the warning means an indication, in particular a warning signal, can be prompted to a machine operator acoustically, visually and/or in some other way. Additionally or alternatively, a pivot range of the upper carriage can be limited or a movement of the upper carriage can be stopped by the warning means. For this purpose, the warning means is connected to the control means to control a drive of the upper carriage.

A preferred further development of this embodiment is provided in that one or several sensor means, in particular a camera unit, for detecting obstacles are arranged. Generally, the sensor means can be designed in any suitable way. In particular, use can also be made of ultrasonic sensors, radar units or other contactless sensors for detecting components or obstacles in a movement range of the feed arm. In principle, contact-dependent sensor means that have contact elements can also be provided. On making contact with an obstacle, these contact elements can trigger a corresponding contact signal.

Furthermore, according to an embodiment variant of the invention it is preferred that along the feed arm the energy line is guided with a variable length. For this reason, the energy line is guided along the feed arm in such a way that length changes of the feed arm and adjustments of members of the feed arm can take place without difficulty.

In conjunction with this it is particularly preferred that a line drum, a cable track and/or a line tensioning means for the energy line is arranged on the upper carriage. If necessary, an additional energy line can be unwound from a line drum on the upper carriage. The line drum can as a whole also be designed such that an energy line of up to 100 meters of length or more is held available on the construction machine itself in order to establish a line connection to a corresponding local energy source at any time. A cable track constitutes an arched arrangement with one or several arches for the energy line along the feed arm so that length changes of the feed arm can be compensated accordingly.

Alternatively or additionally, a line tensioning means can be provided, with which e.g. a helically arranged energy line can be extended and retensioned in a flexible way to compensate for length changes on the feed arm. By preference, in the region of the feed arm a plug means is provided, with which an external energy line can be releasably connected to an internal energy line on the upper carriage. At the corresponding ends of the opposite energy lines matching plugs are arranged. The plugs can in particular be customary plug connections for three-phase current or high-voltage current, preferably with locking.

Another preferred embodiment of the invention resides in the fact that in the region of the feed arm an emergency disconnection means is provided, with which an energy supply via the energy line can be disconnected by the machine operator or automatically in specific emergency situations. The emergency disconnection means can in particular have a lifting element, with which the plugs of a provided plug connection can be pulled apart. In this way, a reliable mechanical disconnection and interruption of the energy line can be brought about.

The emergency disconnection means can in particular be connected to the machine control and/or the warning means on the construction machine.

Figure 2:
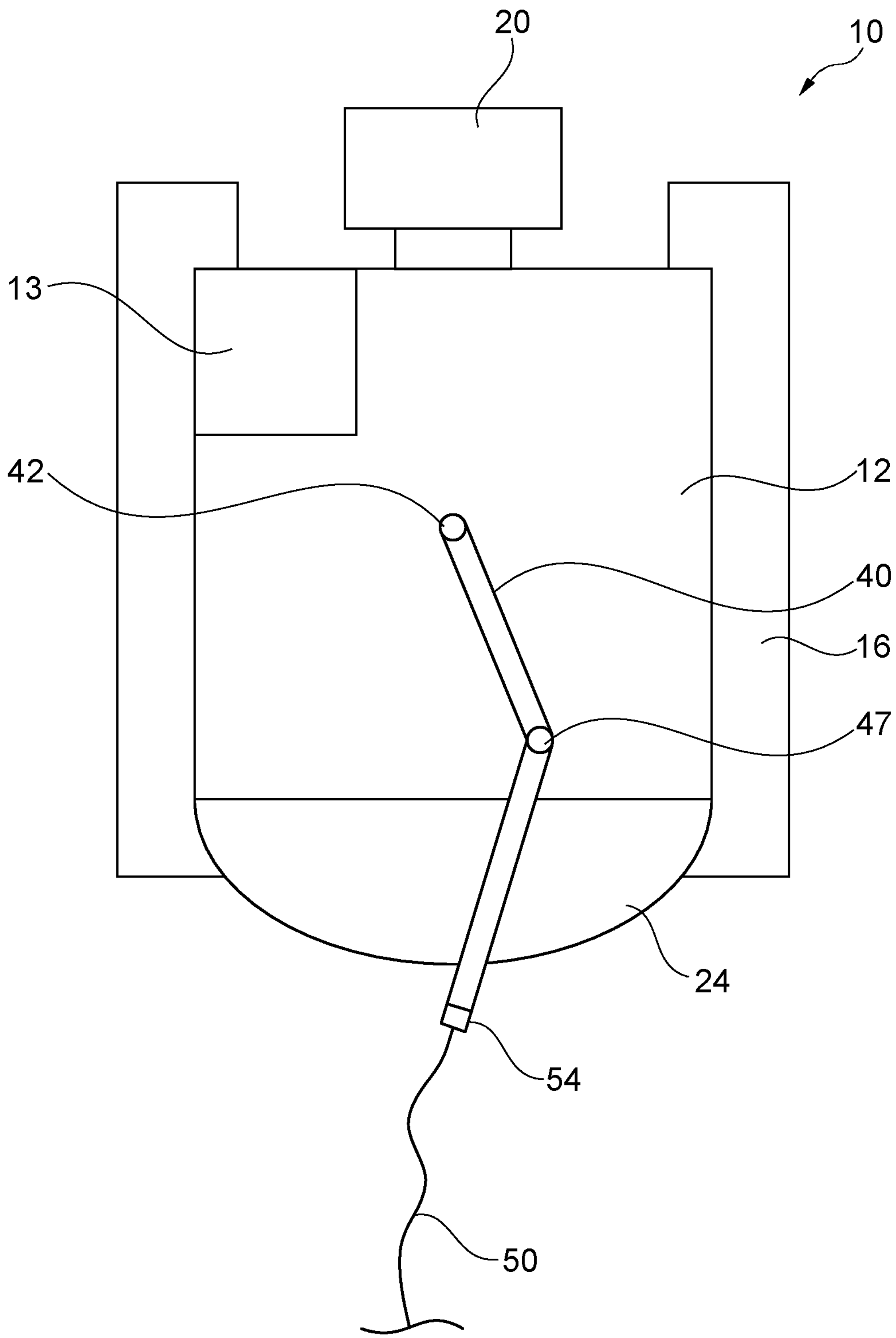

In the following the invention is described further by way of a preferred embodiment illustrated schematically in the accompanying drawings, wherein show:

FIG. 1 a schematic side view of a construction machine according to the invention, in particular a foundation engineering machine; and FIG. 2 a top view of the construction machine of FIG. 1.

According to the Figures a construction machine 10 pursuant to the invention has an upper carriage 12 and an undercarriage 14 that comprises a running gear 16, more particularly a crawler-type running gear. The upper carriage 12 is rotatably supported on the undercarriage 14 and driven about an approximately central, vertically directed upright axis 18. On a front side of the upper carriage 12, mounted in an adjustable manner by way of an adjustment mechanism 22 is a substantially vertically directed mast 20, along which a ground working tool 30 is adjustably supported. The ground working tool 30 can be a drilling tool for example or, as illustrated, a cutting device for producing a hole in the ground.

Moreover, on the upper carriage 12 a cabin 13 for a machine operator is arranged. In the cabin 13 a control means 60 is preferably arranged which is preferably designed to control the construction machine 10 as a whole.

Depending on the mode of operation of the construction machine 10 counterweights 24 can be releasably mounted on the upper carriage 12 on a rear side lying opposite the front side with the mast 20. The number and size of the counterweights 24 can vary and preferably be detected by the control means 60 via non-depicted sensors. For instance, the counterweights can be provided with transponders that can be read out by sensors to transmit information regarding dimensioning.

To feed energy from the outside to the construction machine 10, in particular to feed electric energy, an energy line 50 is provided. The energy line 50 has an external first energy line 50*a* that is connected via a releasable plug connection 54 to an apparatus-internal second energy line 50*b*.

According to the invention the apparatus-internal second energy line 50*b* is guided and retained along a feed arm 40 that is arranged on an upper side of the upper carriage 12.

Here, the feed arm 40 has a pivot axis 42 with a shank that is directed parallel to the upright axis 18 of the upper carriage 12. In the illustrated embodiment the pivot axis 42 is arranged with a certain radial distance to the upright axis 18 but it can also run coaxially thereto. On an upper end of the pivot axis 42, which can lie, for example, between 5 to 50 cm above the upper side of the upper carriage 12, an approximately radially or horizontally directed cantilever arm 44 of the feed arm 40 is mounted. In the illustrated embodiment the cantilever arm 44 is formed by a first arm member 45 and a second arm member 46 which are pivotably connected to each other via a pivot joint 47. The joint axis of the pivot joint 47 is preferably directed parallel to the pivot axis 42 and to the upright axis 18. At the same time, the first arm member 45 and/or the second arm member 46 can be of telescopic design so that an additional length change of the horizontally directed cantilever arm 44 can be set.

The cantilever arm 44 is preferably set by the control means 60 in such a way that it reliably projects, preferably in the rearward direction, over an external circumference of the upper carriage 12 including the counterweights 24 so as to avoid rubbing contact of the energy line 50 with the upper carriage 12 or the counterweights 24.

For active motorized adjustability of the feed arm 40 provision is made on the pivot axis 42 for a first drive means 61, with which the pivot axis 42 is pivotable and/or height-adjustable in the axial direction. Here, in the drawing the feed arm 40 is illustrated in its upward-extended operating position. From this operating position the feed arm 40 can also be moved or folded downwards into a retracted position, e.g. for transport purposes.

By way of a second drive means 62 on the joint 47 the first arm member 45 which is arranged in the pivot axis 42 can also be actively adjusted with respect to the second arm member 46.

To ensure in particular a sufficient length change of the feed arm 40 in a horizontal direction the second apparatus-bound energy line 50*b* is supported along the underside of the feed arm 40 with several arches along a non-depicted longitudinal guide, whereby a length compensation can take place during extension or retraction of the feed arm 40.

The respective movement options of the feed arm 40 are indicated by schematic arrows in the illustrated embodiment. At the free end of the feed arm 40 a movably or adjustably supported plug can be provided for the energy line 50 so that when the feed arm 40 is adjusted the said energy line leads, as far as possible, in the same position into the feed arm 40.

By way of the control means 60 the machine operator can actively adjust the feed arm 40 in a desired way. By preference, the control means 60 comprises an automatic mechanism, with which the feed arm 40 is adjusted relative to the upper carriage 12 in construction operation depending on a movement of the upper carriage 12. In particular, in doing so the assignment of the first energy line 50*a* and the second energy line 50*b* can be kept the same relative to each other so that stress of the entire energy line 50 caused by mechanical tension as well as a rubbing movement of the energy line 50 on the ground can be reduced to a large degree or even avoided. Hence, by way of the arrangement according to the invention a particularly safe operation of the construction machine 10 can be achieved when feeding energy via an external energy line 50. In addition, the automatic mechanism can comprise a pivot limitation to prevent collisions.

The invention claimed is:

1. A construction machine having an upper carriage, an undercarriage which has a running gear and on which the upper carriage is rotatably supported about an upright axis, and a feed arm for at least one energy line, with which energy can be supplied from the outside to the construction machine, the feed arm being adjustably supported on the upper carriage, drive means for actively adjusting the feed arm relative to the upper carriage, and control means for controlling the drive means to adjust the feed arm to reduce a stress on the energy line.

2. The construction machine according to claim 1, wherein the control means is for detecting a position of the upper carriage relative to the undercarriage, and the control means is designed to control the drive means depending on a detected change of position of the upper carriage.

3. The construction machine according to claim 2, wherein the control means is designed to control the drive means such that the feed arm is at a standstill or largely at a standstill relative to the energy line fed from the outside.

4. The construction machine according to claim 1, wherein the feed arm is pivotably supported about a pivot axis on an upper side of the upper carriage.

5. The construction machine according to claim 4, wherein the pivot axis of the feed arm is directed parallel to the upright axis of the upper carriage and/or arranged in the region of the upright axis.

6. The construction machine according to claim 5, wherein the pivot axis of the feed arm is arranged coaxially to the upright axis of the upper carriage.

7. The construction machine according to claim 1, wherein the feed arm is directed radially to the upright axis of the upper carriage and designed with a length, wherein in every pivot position the feed arm projects laterally over the upper carriage.

8. The construction machine according to claim 1, wherein a length of the feed arm is adjustable, in particular depending on a pivot position of the feed arm relative to the upper carriage.

9. The construction machine according to claim 1, wherein the feed arm comprises at least two arm members which are adjustable with respect to each other.

10. The construction machine according to claim 9, wherein the at least two arm members are pivotably connected to each other via at least one joint.

11. The construction machine according to claim 1, wherein the feed arm is height-adjustable in the axial direction of the pivot axis.

12. The construction machine according to claim 1, wherein a warning means is provided, by which a position of the feed arm relative to the upper carriage and/or to further components of the construction machine and/or to obstacles in the surrounding area can be detected and a possible collision with the feed arm can be established.

13. The construction machine according to claim 12, wherein one or several sensor means, in particular a camera unit, for detecting obstacles are arranged.

14. The construction machine according to claim 1, wherein along the feed arm the energy line is guided with a variable length.

15. The construction machine according to claim 1 wherein a line drum, a cable track, and/or a line tensioning means for the energy line is arranged on the upper carriage.

* * * * *